J. EMMERT.
Stove-Pipe Dampers.
No. 138,997. Patented May 20, 1873.
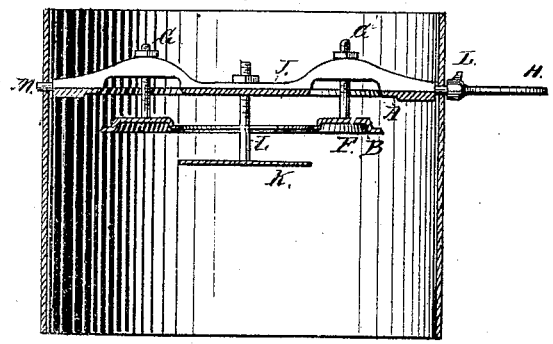
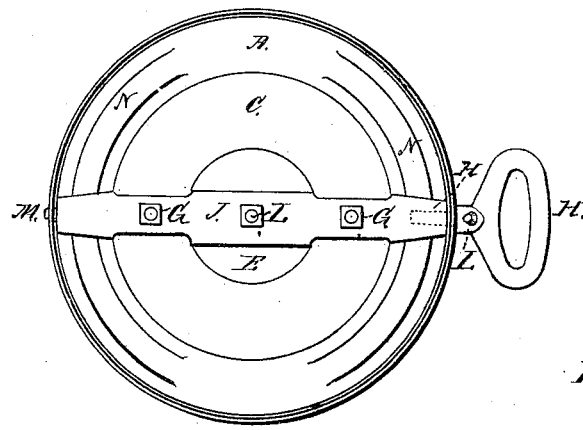
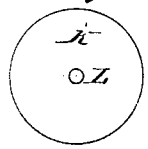
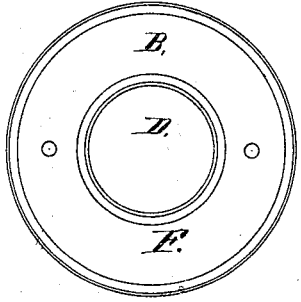
Witnesses.
Alex Simplot
Hosea B Laws
Inventor:
John Emmert

UNITED STATES PATENT OFFICE.

JOHN EMMERT, OF CHICAGO, ILLINOIS.

IMPROVEMENT IN STOVE-PIPE DAMPERS.

Specification forming part of Letters Patent No. 138,997, dated May 20, 1873; application filed November 29, 1872.

*To all whom it may concern:*

Be it known that I, JOHN EMMERT, of Chicago, in the county of Cook and State of Illinois, have invented a new and useful Improvement in Stove-Pipe Damper and Spark-Arrester; and I do hereby declare the following to be a full, clear, and exact description thereof, which will enable others skilled in the art to which my invention appertains to make and use the same, reference being had to the accompanying drawing and the letters of reference marked thereon.

My invention relates to an improvement in devices for the saving of fuel and a contrivance to prevent the escape of sparks, while it allows the passage of gas. It consists of two or more plates situated above each other, connected by any number of bolts or arms desired, upon which the plates slide to and from each other, the bolts passing through the plates secured by a nut on the end of the bolts, or the bolts may be screwed into one or the other of the plates, in which case the nut may be dispensed with, care being taken that the plates work loose enough, so that they may readily slide up and down on the bolts or arms. Each plate, except the smallest one, has one or more projections, and a corresponding number of open places for the entrance of the projections and for the escape of gas. The plates vary in size. The largest one has an axle upon which it revolves, and to it a second one is connected with bolt and screw device to the second plate. A third plate may be connected in like manner, and in this way many plates may be used, each forming a radiating point. The axle on the large plate projects far enough past each side to form a washer to prevent the outer edge of the plate from rubbing hard against the pipe. On one end of the axle is a spindle long enough to pass through the pipe for a partial support of the plate, and at the opposite end of the axle is a thumb-screw entering through a small cavity in the pipe and then into the axle, which can be screwed up tight against the pipe, causing friction both inside and outside, so that the plates may stand on edge when desired. The thumb-screw answers the place of a handle, by which the plates are inverted or revolved. By different movements of the handle in turning, the plates either separate or come together. A small elevation is placed on the handle as an indicator, to show if the plates are closed or open. If closed, it is the same as one plate; then, by turning the handle a quarter revolution, the plate stands on edge, the position required when building fires. If another quarter revolution is made the plates separate and assume the position desired for the radiation of heat and for the arrest of sparks; then, by turning the handle half-way around to the place of beginning, the plates collide, the projections dropping through the open places in the plates, driving out all accumulation of anything which has a tendency to close up or in the least reduce the size of the open space, therefore making it a perfect self-cleaning heat-radiator.

For a high or low draft stove, raise or lower the plates, which will give any sized opening desired.

In the drawing, Figure 1 is a sectional elevation of a section of pipe with my improved heat-radiator and spark-arrester applied to it. Fig. 2 is a sectional view of the large plate which revolves on an axle. Fig. 3 is a sectional view of second plate. Fig. 4 is a sectional view of the bolts connecting the plates together, and upon which they move up or down. Fig. 5 is a sectional view of the smallest of all the plates, and is different from the rest, having only a plain plate with a stem passing up through the center of the large plate, so that it may be moved up and down, so as to close up the central opening, or lowered any distance below to best fill the purpose for which it is designed.

Similar letters of reference indicate corresponding parts.

A, B, and K are the plates. C and D are the open places in the plates; E and F, the projections which drop through the opening in the plates; G, the bolts which connect the plates, so that they may slide up and down thereon; H, the thumb-screw that enters into the axle, as shown by dotted lines; J, the axle upon which the large plate revolves; L a small elevation on the handle as an indicator, to show the position of the plates; M, the spindle on end of axle; N, the brace to strengthen the plate.

Having thus described my invention, what I claim as new, and wish to secure by Letters Patent, is—

The stove-pipe damper and spark-arrester, composed of the two rings A and B and disk K, connected and applied in the manner set forth.

JOHN EMMERT.

Witnesses:
   JAMES MAGUIRE,
   R. A. KENDALL.